Dec. 13, 1927.　　　　　　　　　　　　　　　　　　　1,652,190
C. M. WILLS
FOLDABLE VEHICLE
Filed Aug. 27, 1926　　　　3 Sheets-Sheet 1

INVENTOR
Charles M. Wills
BY
ATTORNEY

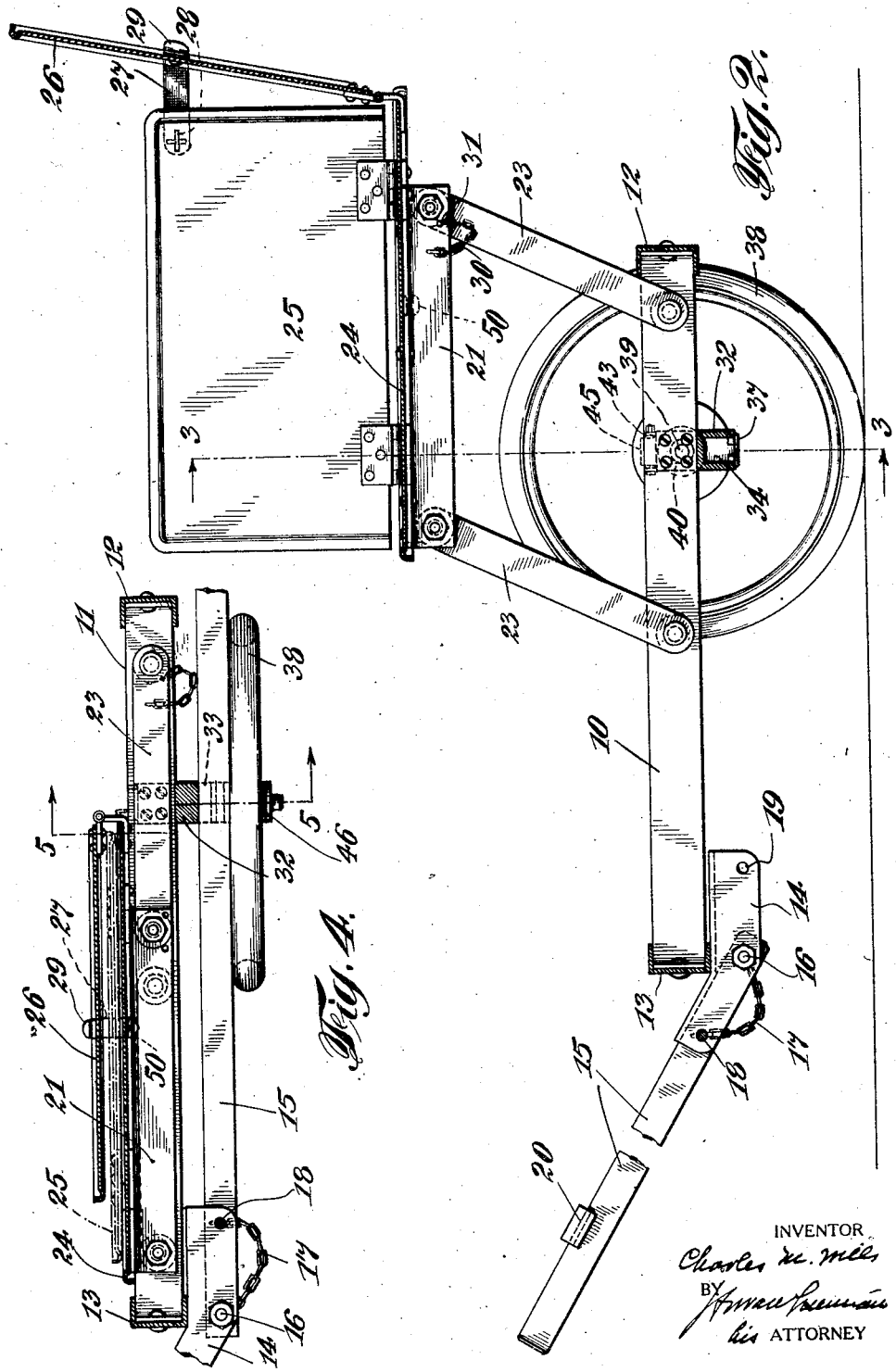

Dec. 13, 1927.

C. M. WILLS 1,652,190

FOLDABLE VEHICLE

Filed Aug. 27, 1926   3 Sheets-Sheet 3

INVENTOR
Charles M. Wills
BY
his ATTORNEY

Patented Dec. 13, 1927.

1,652,190

UNITED STATES PATENT OFFICE.

CHARLES M. WILLS, OF ATLANTIC CITY, NEW JERSEY.

FOLDABLE VEHICLE.

Application filed August 27, 1926. Serial No. 131,836.

My invention relates to vehicles and refers particularly to foldable vehicles.

One of the objects of my invention is a vehicle, particularly adaptable for small children, which, while presenting a stable and comfortable vehicle when so employed, is capable of being readily folded into a compact form for purposes of carrying.

Another object of my invention is a device of the character described in which all of the parts may be readily locked together when the device is in folded position thus facilitating the ease of carriage.

The above, and other, valuable features of the device of my invention will be evident upon a consideration of my specification and its accompanying drawings.

In the accompanying drawings illustrating one form of my device similar parts are designated by similar numerals.

Figure 2 is a cross-section through the line 2—2 of Figure 3.

Figure 4 is a cross-section through the line 4—4 of Figure 5 showing my device in closed position.

Figure 1:
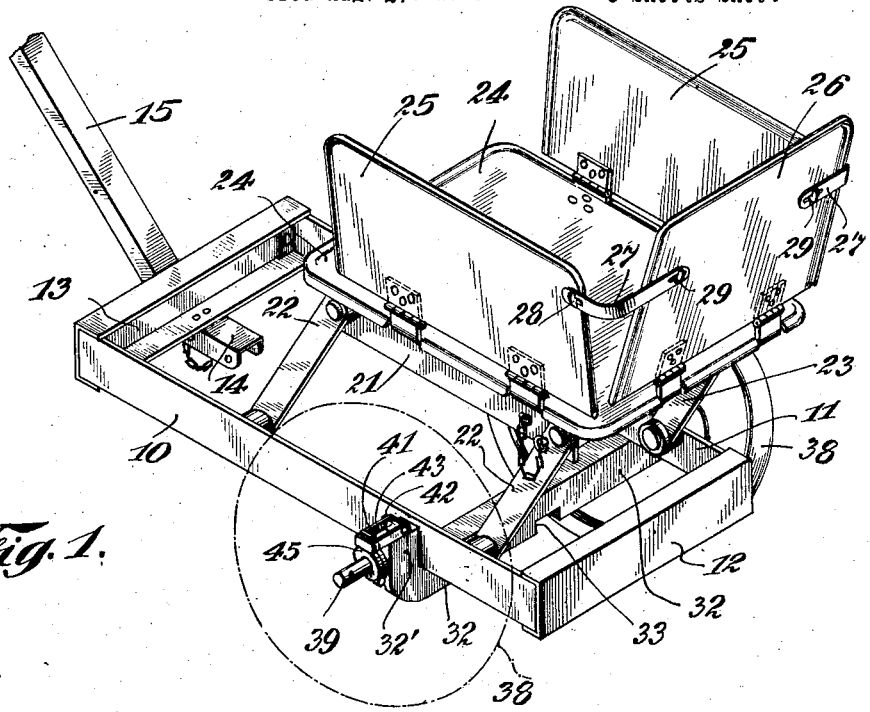
Figure 1 is a perspective view of one form of the device of my invention in open position.
Figures 6, 7:
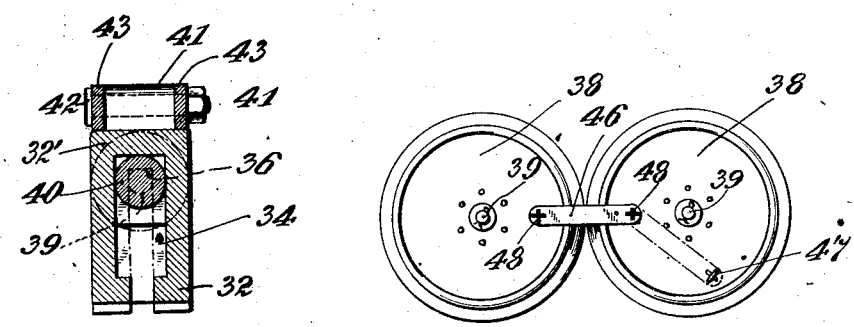
Figure 6 is a cross-section through the line 6—6 of Figure 3.
Figure 7 is a view showing the means of locking the wheels in closed position.

The particular form of the device of my invention shown in the accompanying drawings comprises a body, or chassis having the two sides 10, 11, the back member 12 and the front member 13, the back member 12 and the front member 13 being of U-shape for purposes of stability.

Affixed to the front member 13 is an angular channel shaped tongue-holder 14. A tongue 15 is positioned within the tongue-holder 14 and pivoted therein at 16. A chain 17 carried by the pivot 16 has a pin 18 capable of placement through a hole in the tongue-holder 14 and the tongue 15 to maintain the tongue in the extended position shown in Figure 2. The tongue-holder 14 has another hole 19, so positioned that when the tongue is in folded position the pin 18 will pass therethrough and maintain the tongue in folded position as shown in Figure 4. The tongue 15 carries an extended member 20, the use of which will be explained later.

Figure 5:
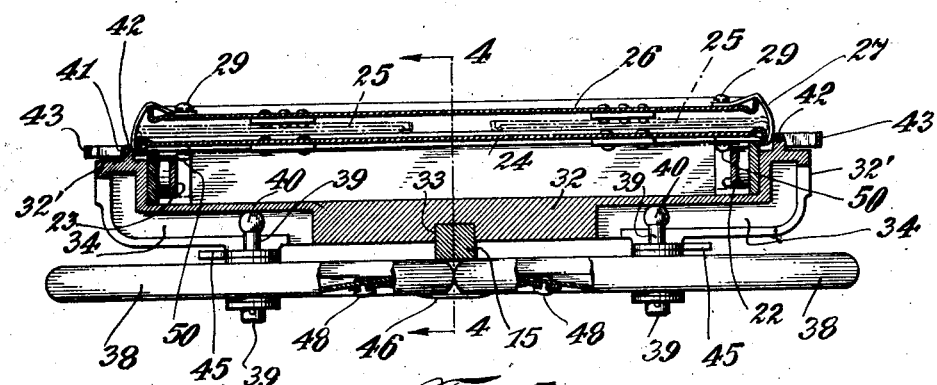
Figure 5 is a cross-section through the line 5—5 of Figure 4.

A seat frame 21, 21 is pivotally carried by, and attached to, the sides 10 and 11 by means of the pivotal links 22, 22 and 23, 23. The position and arrangement of these parts are such that when the device is in unfolded, or useable, position they will be as shown in Figure 2, but when folded forward they will be positioned within the chassis as shown in Figures 4 and 5.

Figure 8:
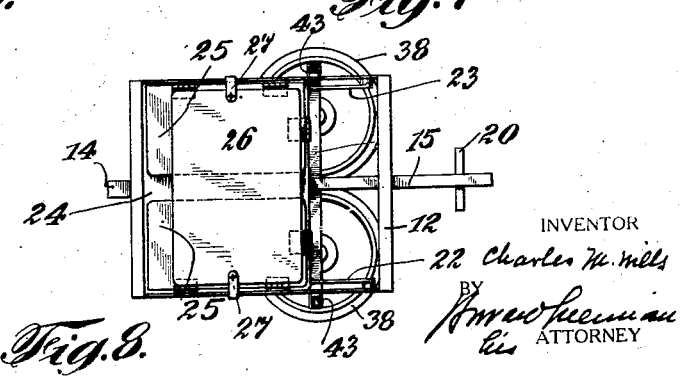
Figure 8 is a top view of the seat elements in closed position.
Figure 3:
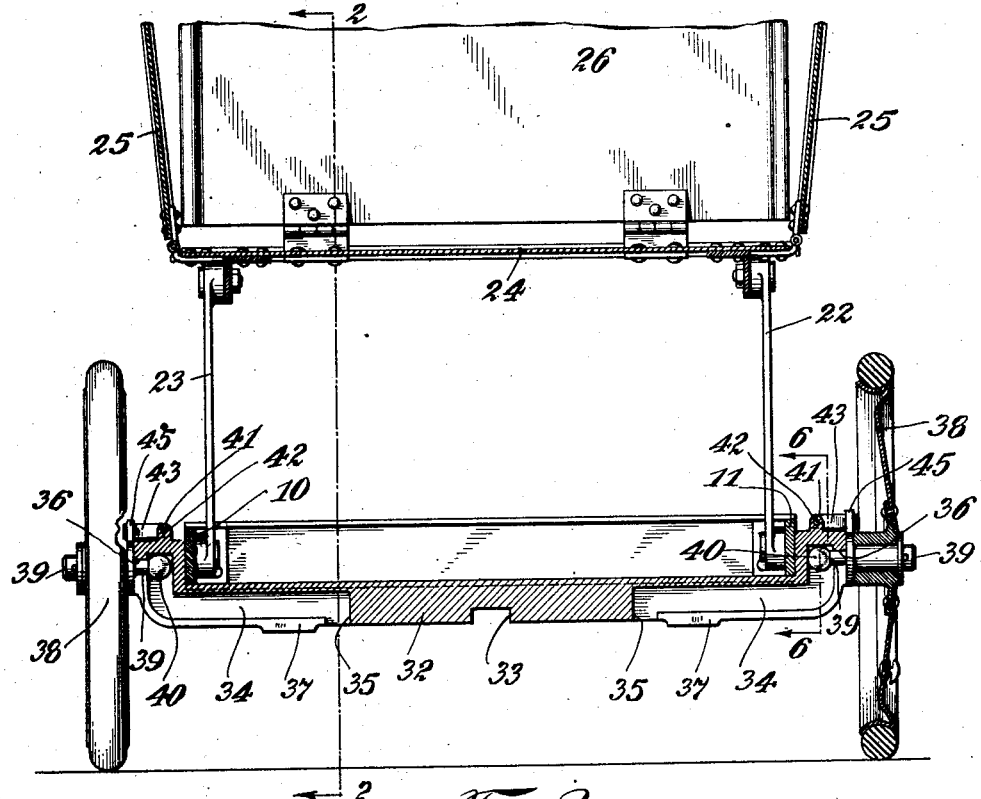
Figure 3 is a rear view of Figure 1, partly in section.

Fixedly attached to, and carried by, the seat frame 21, 21 is a seat bottom 24, to which are hingedly attached the seat sides 25, 25, and the seat back 26. These elements are of such size and arrangement that the sides 25, 25 and the back 26 can be folded downwardly upon the bottom 24 as shown in Figure 8.

Each seat side 25 carries a flexible strap 27, attached at 28 to one of the sides and at 29 to the back 26 by means of wing nuts. These straps serve to retain the seat sides and back when the device is in unfolded position, thus removing the strain from the hinges, and also to retain the seat sides and back from movement when the device is closed, or folded, as will be explained later.

Each seat side 21 carries a chain 30, having a pin 31 capable of passing through openings in the rear link 22, or 23, and the side 21, thus retaining the seat in open position as shown in Figures 1 and 2.

An axle-support 32 is fixedly attached to the chassis sides 10 and 11. This axle-support has a recess 33 capable of receiving the tongue, or handle, extension 20. It has also two channels, or passages 34, 34, each of which has the openings 35 and 36. The outer wall of each passage 34 carries an extended boss 37, 37 for purposes described later.

Upon each side of the device is a wheel 38, the axle 39 of which extends through an opening 36 and carries a ball shaped member 40 within the channel 34.

Each upwardly extended end portion 32' of the axle-support 32 has a boss 41 through an opening within which is a pin 42 pivotally carrying the locking-loop 43 capable of being placed around the locking-key 45 fixedly attached to the axle 39. When the device is in unfolded, or operative, position these elements are in the positions shown in Figure 1. When it is desired to fold the device, the locking-loop 43 is revolved upon the pivot 42, and the wheel thus released, is placed in position beneath the chassis by moving the ball 40 along the channel 34 until the inner hub of the wheel abuts upon the boss 37. The boss of the axle-support at the upper opening 36 and the boss 37 tend to frictionally hold the inner hub of the wheel when in open and closed position respectively allowing free passage of the ball 40 during its movement through the channel 34.

One of the wheels 38 carries a pivotal strap 46, which when the device is in open position is removably attached by a wing-nut 47, or otherwise, to the same wheel, but when the device is in folded position the strap 46 is attached by a wing-nut 48, or otherwise to the other wheel, thus retaining the two wheels in closed position.

The operation of the device is as follows:—

The device in open, or operative, position, is shown in Figure 1. When it is desired to close, or fold, the device the straps 27, 27 are released from the sides 25, 25 and the sides and the back 26 are folded upon the seat 24.

The straps 27, 27 are then attached to the wing-nuts 50, 50 carried by the lower face of the seat 24, thus locking the sides and back in folded position.

The pins 31, 31 are withdrawn, and the seat portion moved forwardly and downwardly upon the links 22, 22, 23, 23. The pin 18 of the handle 15 is withdrawn and the handle revolved upon the pivot 16 and the pin 18 placed through the handle hole and the hole 19, thus locking the handle in closed position, side movement being prevented by the extension 20 fitting within the recess 36 of the axle-support 32.

The wheel locks 43, 43 are released and the wheels 38, 38 folded beneath the chassis by moving the balls 40, 40 along the channels 34, 34 and when in folded position, they are locked together by the strap 46.

It will thus be seen that the device is folded into a minimum of space and that all of the elements are locked together, thus presenting a device capable of being easily folded into a convenient form for carrying.

I do not limit myself to the particular size, shape, number or arrangement of parts as shown and described as these are given simply as a means for clearly explaining the device of my invention.

What I claim is:—

1. In a foldable vehicle, in combination, a chassis frame, a seat spaced from said frame, pivotal means connecting said seat and said frame and allowing the folded placement of the seat upon the frame, means for locking the seat in said spaced position, means for locking the seat in said folded position, two sides hingedly carried by said seat and capable of folded position thereon, a back hingedly carried by said seat and capable of folded position thereon, removable straps connecting the sides and the back retaining them in open position and capable of locking them when in folded position, a handle pivotally carried by said chassis frame, means for locking the handle in extended position, means for locking the handle in its folded position within the chassis, wheels carried by opposite sides of the chassis frame, means whereby the said wheels may be placed in folded position beneath the chassis, and means for locking said wheels in said folded position.

2. In a foldable vehicle, in combination, a chassis frame, a seat spaced from said frame, pivotal means connecting said seat and said frame and allowing the folded placement of the seat upon the frame, means for locking the seat in said spaced position, means for locking the seat in said folded position, two sides hingedly carried by said seat and capable of folded position thereon, a back hingedly carried by said seat and capable of folded position thereon, removable straps connecting the sides and the back retaining them in open position and capable of locking them when in folded position, a handle pivotally carried by said chassis frame, means for locking the handle in extended position, means for locking the handle in its folded position within the chassis, an axle-support carried by the chassis, a revoluble wheel carried by each end of the axle-support, removable means for maintaining each wheel in operative position, means whereby each wheel may be positioned beneath the chassis without removing it from the axle-support, and means whereby the wheels may be locked in position beneath the chassis.

3. In a foldable vehicle, in combination, a chassis frame, a seat spaced from said frame, pivotal means connecting said seat and said frame and allowing the folded placement of the seat upon the frame, means for locking the seat in said spaced position, means for locking the seat in said folded position, two sides hingedly carried by said seat and capable of folded position thereon, a back hingedly carried by said seat and capable of folded position thereon, removable straps connecting the sides and the back retaining them in open position and capable of locking them when in folded position, a handle pivotally carried by said chassis frame, means for locking the handle in extended position, means for locking the handle in its folded position within the chassis, an axle-support carried by the chassis and having a passage in each end portion thereof, two revoluble wheels each having an axle with an enlarged portion movable within one of the axle-support passages, means for locking the wheels in operative position, means whereby each wheel when unlocked from operative position may be guided by the movement of the axle enlarged portion within the passage to a portion beneath the chassis, and means for locking the wheels in position beneath the chassis.

4. In a foldable vehicle, in combination, a chassis frame, a seat spaced from said frame, pivotal means connecting said seat and said frame and allowing the folded placement of the seat upon the frame, means for locking the seat in said spaced position, means for locking the seat in said folded position, two sides hingedly carried by said seat and capable of folded position thereon, a back hingedly carried by said seat and capable of folded position thereon, removable straps connecting the sides and the back retaining them in open position and capable of locking them when in folded position, a handle pivotally carried by said chassis frame, means for locking the handle in extended position, means for locking the handle in its folded position within the chassis, an axle-support carried by the chassis and having a passage in each end portion thereof, two revoluble wheels each having an axle with an enlarged round portion movable within one of the axle-support passages, hook means for locking the axles in operative position, means whereby each axle when unlocked from operative position may be guided within the passage to a portion beneath the chassis, and means carried by one of the wheels for locking the wheels in position beneath the chassis.

Signed at Philadelphia, in the county of Philadelphia and State of Pennsylvania, this 20th day of August, 1926.

CHARLES M. WILLS.